Feb. 26, 1935. F. F. PEASE 1,992,762
METHOD OF WASHING GASES
Filed April 2, 1931 2 Sheets-Sheet 1
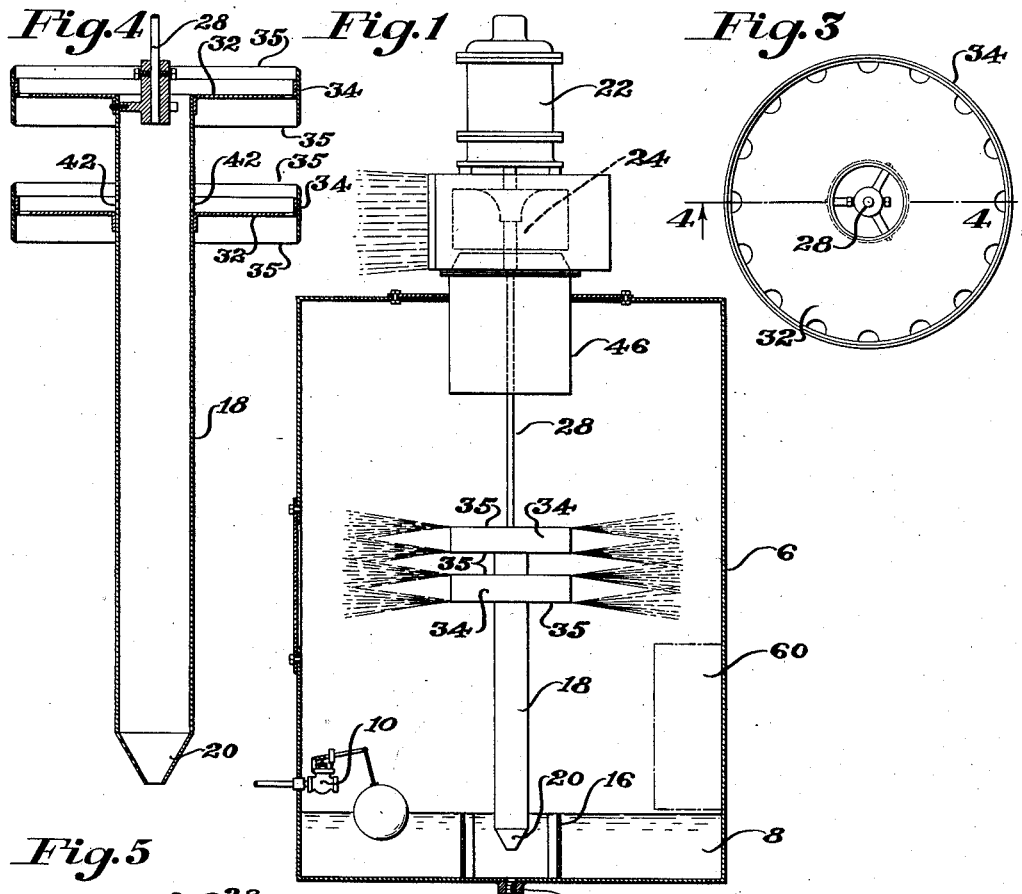
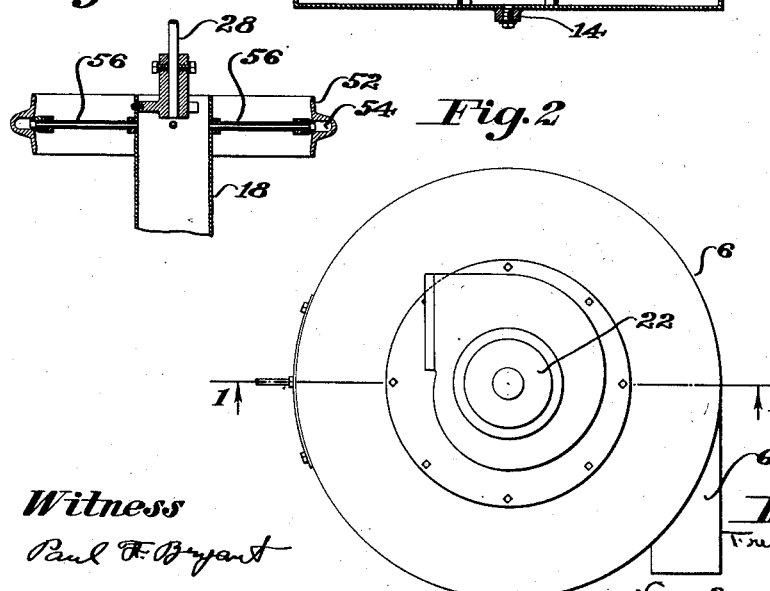

Feb. 26, 1935.  F. F. PEASE  1,992,762
METHOD OF WASHING GASES
Filed April 2, 1931  2 Sheets-Sheet 2
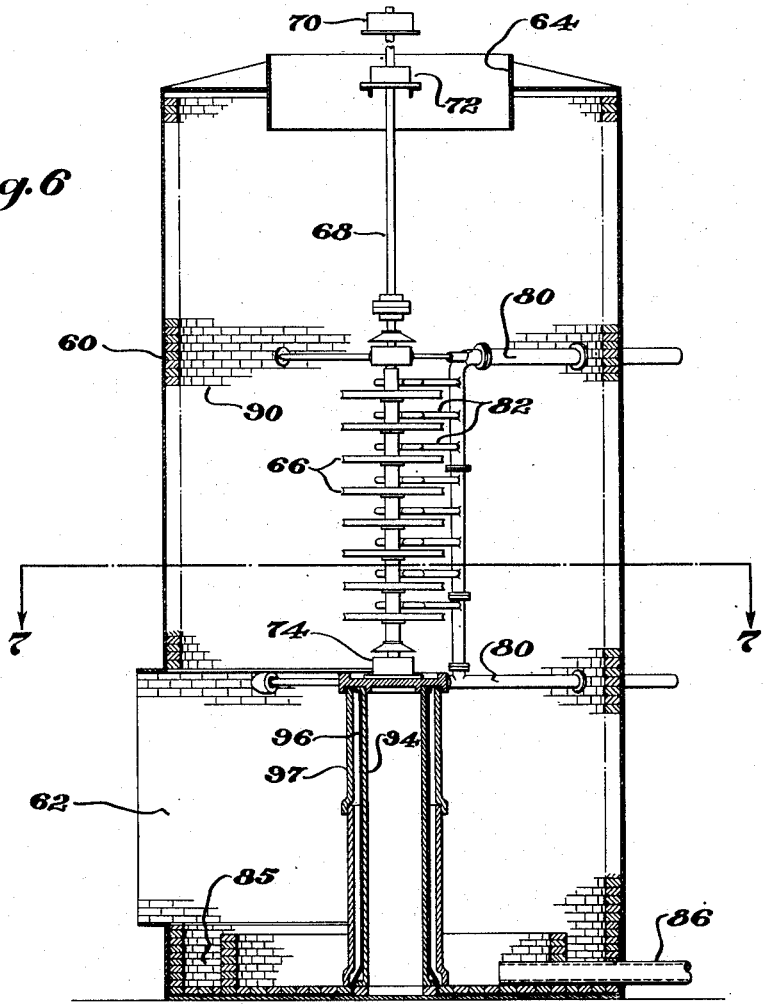
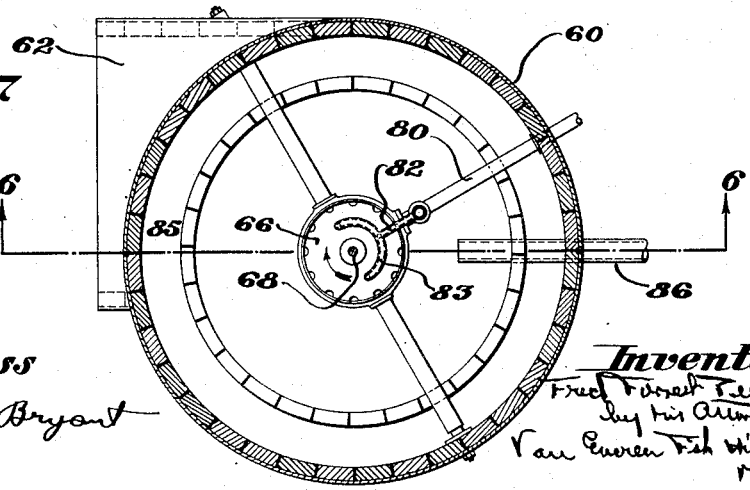
Witness
Paul F. Bryant
Inventor
Fred Forrest Pease Patented Feb. 26, 1935

1,992,762

UNITED STATES PATENT OFFICE 1,992,762

METHOD OF WASHING GASES

Fred Forrest Pease, Squantum, Mass., assignor to Pease, Anthony Equipment Co., Cambridge, Mass., a corporation of Massachusetts Application April 2, 1931, Serial No. 527,159

4 Claims. (Cl. 183—121)

The present invention relates to a method of washing gases, such as air or flue gases, and incidentally to the promotion of humidification of the air or gas if this becomes desirable. In addition, the invention contemplates apparatus particularly designed and adapted for carrying out my new method.

I have found that the removal of dust from air or fine dust and solid particles, such as particles of ash or cinders, from flue gases, can be satisfactorily accomplished with my method, whereas with existing methods of separation, a certain percentage of the fine, suspended, solid matter inevitably escapes the washing operation unless this operation is continually repeated or the gas made to traverse such a space that the operation becomes entirely impractical for commercial purposes.

It is the object and aim of the present invention to wash and scrub air and similar gases so thoroughly that substantially all soluble gases and suspended matter, whether coarse or fine, is removed to the desired extent efficiently with a minimum consumption of power and incidentally of the liquid employed for washing, and with time and space limitations which fall well within practical requirements.

I am enabled to accomplish this advantageous result by delivering washing liquid in the form of a spray to the central portion of a rotating cylindrical mass of gas to be cleaned. Preferably and desirably, atomization of the spray is sufficiently fine to cause the individual spray particles of liquid to approximate the minimum size of the dust particles to be removed. Such a spray has insufficient momentum to traverse throughout the surrounding body of gas, and in order to complete its traverse and promote complete and intimate contact of the spray and gas with suspended solids, the gas body is caused to rotate or spiral about a central axis from which the spray is delivered. This spiraling of the gas body must be at sufficient velocity to create a measurable centrifugal action upon solid materials located therein, including the spray drops, and cause these spray drops to be worked outwardly to the periphery of the cylindrical body when engaged thereby. It follows, therefore, that the initial intimate sub-division of the spray promotes a consequent thorough and intimate intermingling of the liquid spray and suspended solid which accomplishes a complete wetting of the suspended solid matter. This wetted matter, due to its increasing specific gravity, is worked outwardly and caused to impinge against the wetted walls of the duct or chamber. In addition, particles of spray not usefully employed in wetting solid matter, are worked through the mass of gas and engage with the walls of the chamber. It must be evident to those skilled in the art that for the successful accomplishment of my purpose, liquid in excess of the amount required to wet the solid materials in the gas or air must be employed, this excess of liquid working through the column of air or gas and impinging upon the walls of the container by centrifugal action. If the gas is capable of absorbing quantities of a vaporizable liquid, such as water, then the volume of washing liquid employed must be further increased to accomplish the necessary wetting down of solid material with liquid in addition to that portion of the liquid volume which may be evaporated by the surrounding gas.

The employment of a finely-divided spray mist which thoroughly wets the entire solid content of the gas substantially increases the mass of the finer particles through absorption of water directly from the gas stream which is at a very high relative humidity. This increase of mass of the fine particles is an important factor in promoting separation. In addition, a condition of high humidity in the gas stream is detrimental to the retention by the dust particles of electric charges which otherwise operate to maintain each particle isolated both from the other particles and from the walls of the treating chamber. In other words, a condition of high humidity, due to the introduction of the washing spray, aids in overcoming an otherwise inherent difficulty to satisfactory dust collection. In this connection it will be evident that the finer the particle, the greater the electrostatic force in comparison to the weight of the particle. Thus with the finest dust on the order of one to five microns, it is probable that effective collection cannot be secured, except with conditions of high humidity or some alternative method of controlling the electrostatic condition.

In the simplest and best form of my invention which I have yet devised, I have found that treating or washing of the gases can be admirably carried out in a substantially vertical chamber of generally circular cross-section, the one or more radiating liquid sprays being delivered from the axis of this chamber into a surrounding body of gas, which spirals upwardly throughout the chamber. Gas is preferably admitted at the lower end of the chamber tangentially thereof at sufficient velocity to maintain a definite spiraling movement. This velocity may be created by a pressure fan which forces the gas or air into the lower end of the chamber or by an exhaust fan which continuously withdraws air or gas from the upper end thereof. The liquid spray or sprays are preferably and desirably delivered to the gas from one or more rotating spray heads or disks which are arranged in tandem formation lengthwise of the chamber, and due to their construction are capable of delivering comparatively large volumes of treating liquid in a finely atomized condition.

It will be evident that with this method, humidification of the air or gas if the washing liquid employed is water, inevitably takes place, and it has been found in consequence that the present invention is admirably adapted for the treatment of gases by the combined washing and humidification of the gas.

The present application is a continuation in part of my earlier application, filed on November 1, 1927, Serial No. 230,366.

In the accompanying drawings illustrating the preferred form of the invention,

Fig. 1 represents an elevation of an apparatus partly in section designed particularly for the washing and humidification of air;

Fig. 2 is a top plan view of the apparatus shown in Fig. 1;

Fig. 3 is a detail illustrating a plan view of the spray device;

Fig. 4 is a section of the spray device and liquid elevator;

Fig. 5 is a modified form of spray device;

Fig. 6 is a section in elevation of an apparatus particularly adapted for the washing of flue gases and removal of fly ash and cinders and similar solid matter therefrom; and Fig. 7 is a detail illustrating the construction for delivering water to the spray disks in the apparatus of Fig. 6.

Referring particularly to my new method as carried out by the apparatus shown in the drawings, it will be observed that the gas to be cleaned is introduced adjacent the lower end of a cylindrical chamber in a tangential direction to promote a spiraling movement of the gas thereabout. The velocity of this gas throughout its passage within the chamber is maintained at a rate sufficient to promote centrifugal action of solid matter or liquid therein, and cause the liquid or solid particles of specific gravity greater than that of the gas to be directed transversely across the path of the gas to the periphery of the cylindrical gas body. The interior of the chamber in either event is substantially free from obstructions which impede or interfere in any manner with the free flow of gas therethrough. The central portion of the chamber axially thereof is provided with one or more devices for introducing a radial liquid spray at the vortex of the spiraling gas body. This spray is preferably introduced by a series of rapidly rotating disks, the peripheral speed of which approximates 9000 feet per minute, or thereabouts. Such disks at the peripheral speed given, produce a spray in which particles below 100 microns in diameter predominate. These spray heads are thus capable of securing a fine atomization of the liquid spray sufficient to contact with and wet down all of the solid particles of the gas or air in whatever state of fineness or sub-division they may be. Due to the location of the spray device and the cylindrical form of the gas body, all particles of the spray have the same distance to travel through the gas body before contact with the surrounding wall of the chamber. Furthermore, all material carried within the gas must encounter one or more radiating sheets of liquid spray before emerging from the chamber. The gas preferably escapes from the upper end of the chamber through a centrally located discharge passage having an area comparable with that of the inlet pipe. Thus the gases have to travel inwardly and counter to the centrifugal action, promoting and insuring the finer separation of solid and liquid particles before discharge from the chamber. With this method liquid spray may be delivered in so fine a state of atomization that normally at least the major portion of the spray, if vaporizable, would be completely dissipated in the surrounding gas and its initial momentum overcome within a short distance from its point of delivery about the edge of the spray disk. This means that a spray in such a fine state of atomization will necessarily promote the most intimate contact between liquid and finely-divided solids in the air. Such a spray, however, would be entirely ineffective unless coupled with some method of promoting and insuring contact of the liquid spray throughout the entire cross-section of the gas body. This is accomplished in the present method by delivering this finely atomized spray into a surrounding and rotating body of gas designedly intended to pick up the liquid spray delivered from the vortex of the gas body with normally insufficient momentum to cause it to traverse outwardly, and due to centrifugal force work this spray outwardly to the surrounding walls of the chamber. This method of operation, that is to say, the introduction of a liquid spray in an extremely fine state of atomization with promotion of intimate contact between the spray and the gas by virtue of the gas velocity and directional movement, is of major importance, and is measurably distinguished in the results accomplished from the mere introduction of a coarse rain of spray which is intended to traverse the surrounding gas body due to its initial momentum. In such a case the scrubbing or washing depends partly upon such variable and incomplete contact as may be created by the coarse spray itself, but depends primarily upon contact of the gas with the surrounding wet walls of the chamber. The introduction of tortuous passages, baffles, and partitions of various kinds adapted to be initially wet and maintained wet during the washing operation is a tacit recognition of this in existing apparatus.

In the illustrated embodiment of the invention, which is admirably designed for carrying out my improved method, the operation is carried out in a closed container or compartment provided by a casing 6. The liquid to be employed for spray purposes is preferably located in the bottom of the compartment, as indicated at 8. The level of liquid is conveniently maintained automatically, and fresh liquid supplied by a float-operated valve, indicated generally at 10. Liquid is elevated to the spray device from the reservoir at the bottom through an elevating tube, indicated generally at 18. As shown more particularly in Fig. 4, this tube is generally cylindrical throughout its length, but is provided with a reduced conical portion 20 at the lower end, which by virtue of the reduction of the tube serves to elevate a wall of liquid upwardly within the tube through the pressure exerted by centrifugal force. Connected with the upper portion of the elevator tube and arranged concentrically with respect to the axis of rotation of the tube are a plurality of spray devices, each having a distributing surface generally concentric with the axis of rotation. As indicated more particularly in Figs. 1, 3 and 4, each spray device comprises a cylindrical band 34 supported by a radial hub 32 which also serves for the delivery of liquid from the elevating tube to the cylindrical surface. As indicated more particularly in Figs. 3 and 4, each radial supporting member adjacent its periphery is provided with a series of liquid orifices or passages which deliver liquid over the distributing surface above and below the support from whence it is transmitted to upper and lower spray edges 35. It will be evident from an inspection of Fig. 4 that two spray devices are provided, each having a circular distributing surface and supporting hub. The liquid is delivered from the lower spray device through openings 42 formed in the elevator tube, from whence it is distributed in the manner previously described. These spray devices, as indicated more particularly in Fig. 1, deliver a series of finely-divided, radial sprays, and cause a thorough intermixture of the liquid spray with the ascending column of gas. The elevator tube and spray devices are conveniently supported from a shaft 28, which serves for rotating the tube and spray devices. The shaft depends from a drive motor 22 of conventional form mounted above the spray compartment, as indicated. The gas to be conditioned or washed is preferably drawn inwardly through a tangential opening 60 adjacent the bottom of the compartment above the liquid reservoir, and thereafter ascends upwardly, at the same time spiraling about the circular wall of the compartment as it passes through the liquid spray. The movement of gas through the compartment is created by an induced draft fan, indicated generally at 24, which may be mounted directly upon the shaft 28, or an extension of this shaft, and is capable of imparting the requisite velocity to the gas. During the passage of the gas through the spray, a certain percentage of liquid is taken up and evaporated to condition the gas, and a certain additional percentage of liquid is inevitably entrained in the gas column in the form of liquid drops. Spiraling or whirling motion of the air is sufficient to eject and precipitate entrained liquid from the air column in the region above the spray, this liquid in major part encountering the walls of the compartment and returning to the reservoir at the bottom. As shown in Fig. 1, the inlet 46 through which the humidified air passes to the fan is concentric with the chamber and is of relatively small area compared to that of the chamber. Inasmuch as the body of gas in the chamber is rotating, it passes to the inlet of the fan at a high velocity and along curved paths which materially assist in the dispelling of entrained particles. Combined with the particles of liquid delivered from the air are any particles of foreign matter, such as dirt, encountered by the liquid and removed therewith. After passing through the spray, the conditioned gas is delivered outwardly through a passage formed by a depending tubular shield 46.

In addition to the form of spray device illustrated in Figs. 3 and 4, a spray device illustrated more particularly in Fig. 5 may be employed. The spray device comprises a cylindrical distributing surface 52 having an annular liquid channel 54 formed therein. Liquid is delivered to the channel through a series of hollow radial arms 56 connecting the upper portion of the elevator tube 18 at separated points in the channel. The arms, in addition, serve for supporting and mounting the distributing member. Owing to the provision of the annular channel, an ample supply of liquid is insured for delivery to the distributing surface, the channel acting as an auxiliary reservoir for making an ample supply available at all times as liquid is delivered from the upper and lower spray edges bounding the surface. Although both forms of spray device are practical, it is believed that the form of spray device illustrated in Figs. 3 and 4 is to be preferred to the type of spray device illustrated in Fig. 5.

In order to prevent turbulence in the liquid reservoir and permit substantial clarifying of the liquid for reuse, a perforated casing 16 is submerged in the liquid at the bottom of the compartment surrounding the lower end of the elevator tube 18. In addition, a removable drain plug 14 is provided for emptying the compartment and cleaning, if so desired.

The apparatus shown in Figs. 1 to 5 is particularly adapted for conditioning and washing atmospheric air. It will be evident that, owing to the elimination of entrainment, the apparatus can be made in a compact and unitary form, the air to be washed and conditioned entering from the bottom and delivered from the top free from entrained liquid particles without the employment of extended baffling or other expedients commonly resorted to in apparatus of this character. Fig. 6 illustrates a form of apparatus particularly adapted for the removal of fly ash, dust, cinders, and similar solid matter, together with $SO_2$ gas from flue gases. In this construction a vertical and substantially cylindrical chamber 60 is provided with a tangential passage 62 at its lower end for the input of flue gases. These gases after delivery to the lower end of the chamber spiral about the periphery of the chamber in a gradually ascending column until delivered from the upper end through the centrally located outlet 64. Located centrally within the chamber and between the upper and lower ends of the chamber are a series of liquid spray disks 66 mounted upon a vertical shaft 68 which is driven from above in any convenient manner through a pulley 70. This shaft is provided with upper and lower bearings 72 and 74, respectively. Washing liquid in the form of water is delivered to the chamber through pipes 80, and thence through branches 82 terminating in perforated forked portions 83 to the surfaces of the disks from which it is radiated outwardly and spun from the peripheral edges of the disks. With this construction, the upwardly ascending spiraling body of gas encounters a series of radial sprays which are worked outwardly across the gas body and impinge upon the walls of the chamber. These walls are maintained continuously wet and the solid material thrown thereagainst through the washing operation is engaged and held and gradually worked and washed down the walls to become collected in the sump 85 at the bottom of the chamber from which the water which contains the solid material is withdrawn through a pipe 86. Due to the vigorous corrosive action of the sulphur gases when combined with water in the form of spray, the parts in contact therewith are made of non-corrosive material, and portions of the chamber which might otherwise be corroded are protected as indicated. It will be noted that the interior of the chamber is substantially completely lined with acid-proof brick, indicated at 75

90, as well as the bottom and side walls of the sump, and a supporting column 94 is completely surrounded with a lead sleeve 96 which in turn is surrounded with a separated sleeve in the form of earthen pipe or its equivalent 97. The moving parts, such as the disks, exposed to direct contact with the gas are preferably made of a ferrous alloy having a high nickel chrome content or some similarly non-corrosive, highly-resistant material.

It will be evident from the foregoing description that the two types of apparatus have an identical mode of operation, and except for minor differences in construction are physically similar. In each case the gas in the form of air or otherwise is introduced at one end of the treating chamber, which is generally cylindrical in form, is caused to spiral thereabout as it progresses lengthwise of the chamber, and is finally discharged through a centrally located orifice having a diameter substantially smaller than that of the washing chamber. In both cases the introduction of the liquid spray is accomplished by a rotating spray head to secure the requisite fine atomization, the sheets of spray being introduced into the body of gas intermediate the inlet and discharge end of the chamber, and the spray heads being sufficiently small in diameter to confine the introduction of the spray to the region of the axis, so that a comparatively large cross-section of the chamber is left free for intimate contact of delivered spray and gas. It is furthermore true that the rotation of the spray heads is in the same direction as the rotative movement of the gas body so that whatever rotational effect may be imparted by the delivery of the spray tends to enhance the rotative effect of the gas rather than otherwise. The bulk of the liquid spray ordinarily is delivered from the edge of the spray cup or cups in a state of atomization so fine that the initial momentum is normally destroyed by friction within the body of gas before accomplishing its purpose unless some further expedient is adopted for insuring the completion of its traverse. In addition to its practicability for the separation and removal of dust and solid materials in a finely-divided condition, the process is equally effective for the separation and removal of gases soluble in the liquid spray medium independently of whether or not the gas or air in process of treatment contains additional solid matter which is likewise to be removed.

What is claimed is:

1. The method of substantially completely washing gas which consists in finely dividing a washing liquid into minute spray particles, said particles forming a spray in which particles below 100 microns in diameter predominate and being of such minute size that sufficient initial momentum cannot be imparted thereto to project said particles across the body of gas to be washed, supplying said particles to an elongated treating zone of substantially circular cross section adjacent the center thereof, passing the gas to be washed through said treating zone and whirling said gas about said center with sufficient velocity to carry said particles by centrifugal force, outwardly through the gas to the boundary of said zone to cause complete and intimate contact with the entire body of gas and to remove said particles along with entrained impurities from the gas.

2. The method of substantially completely washing gas which comprises finely dividing a washing liquid into minute spray particles, projecting said particles with high velocity outwardly from the center of a treating zone containing the gas to be washed, said particles forming a spray in which particles below 100 microns in diameter predominate and being of such minute size that the resistance of the gas prevents the initial momentum of said particles from carrying them outwardly to the boundary of said treating zone, and whirling the gas in said treating zone about said center with sufficient velocity to carry said minute particles by centrifugal force through said gas to said boundary to cause complete and intimate contact of the washing liquid with the entire body of gas and to remove said particles along with entrained impurities from the gas.

3. The method of washing gas containing minute dust particles which comprises finely dividing a washing liquid into minute spray particles, said spray particles approximating in size the smallest of the dust particles contained in the gas and being of such minute size that sufficient momentum cannot be imparted thereto to carry said spray particles through the body of gas to be washed, supplying said spray particles to a washing zone adjacent the center thereof, said washing zone containing the gas to be washed, and whirling said gas about said center with sufficient velocity to carry spray particles and attached dust particles outwardly by centrifugal force through said gas to the outer boundary of said zone.

4. The method of washing gas containing minute dust particles which comprises finely dividing a washing liquid into minute spray particles, said spray particles approximating in size the smallest of the dust particles contained in the gas and being of such minute size that sufficient initial momentum cannot be imparted thereto to carry said spray particles through the body of gas to be washed, supplying sufficient of said spray particles to a washing zone adjacent the center thereof to completely humidify and wash gas passing through said washing zone, and whirling the gas in said washing zone with sufficient velocity to carry unevaporated spray particles and attached dust particles outwardly by centrifugal force to the outer boundary of said zone.

FRED FORREST PEASE.